Aug. 31, 1965     L. V. WHISTLER ETAL     3,203,105
TRANSFER DEVICE
Filed April 17, 1963     2 Sheets-Sheet 1
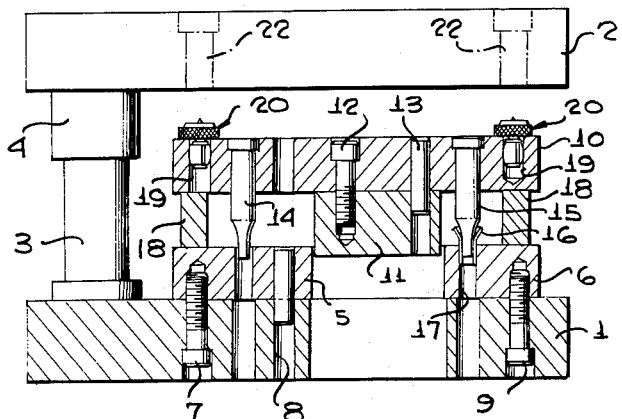
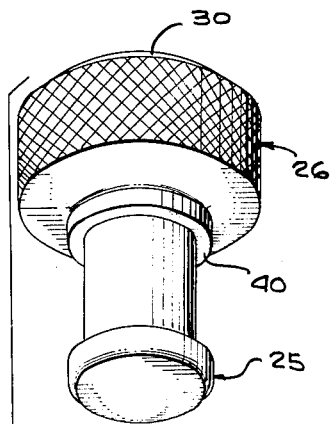
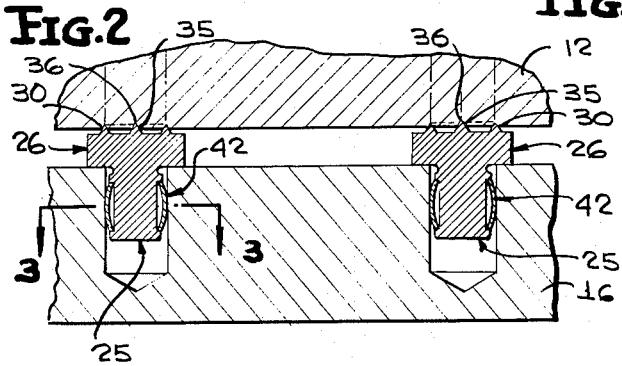
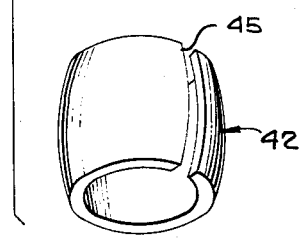
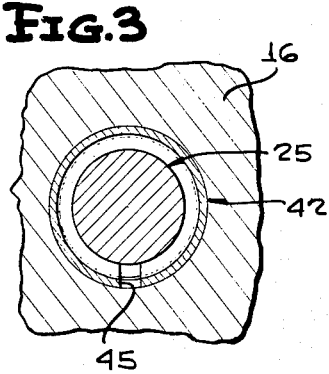
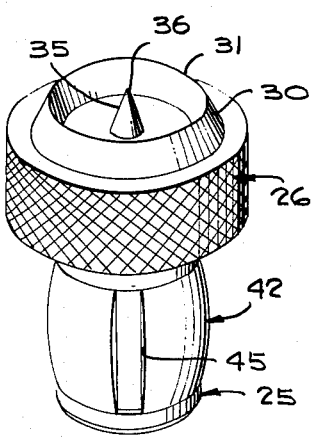
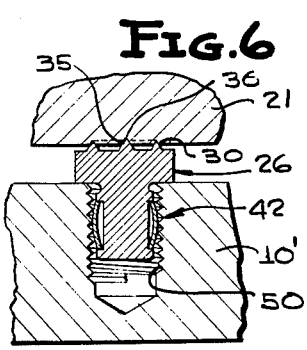
INVENTORS
LAWRENCE V. WHISTLER
& LAWRENCE V. WHISTLER, JR.
BY *Shoemaker and Mattare*
ATTORNEYS

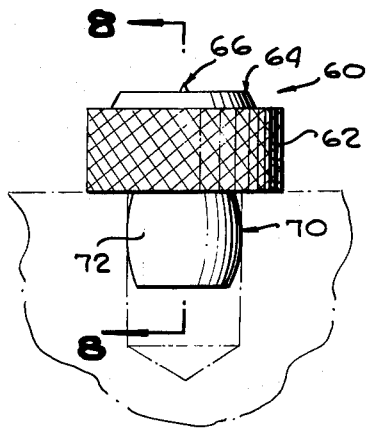
FIG.7
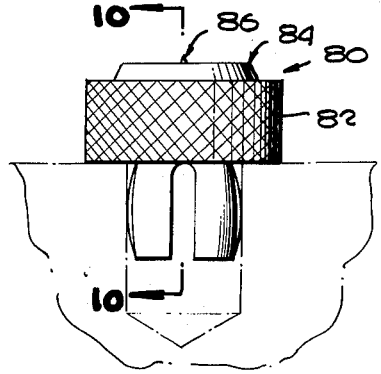
FIG.9
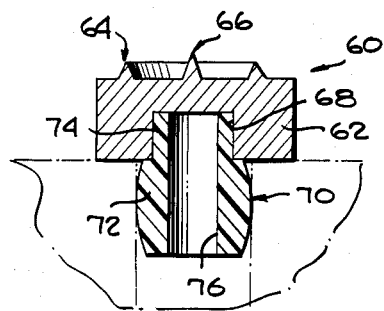
FIG.10
FIG.8
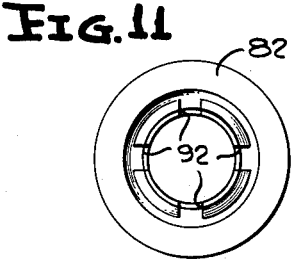
FIG.11

United States Patent Office 3,203,105
Patented Aug. 31, 1965

3,203,105
TRANSFER DEVICE
Lawrence V. Whistler, 251 Doncaster Road, and Lawrence V. Whistler, Jr., 259 Doncaster Road, both of Kenmore, N.Y.
Filed Apr. 17, 1963, Ser. No. 273,790
6 Claims. (Cl. 33—189)

The present invention relates to a new and novel transfer device, and more particularly to a transfer device which is particularly adapted for use in die work for locating holes to be drilled or drilled and tapped to hold various sections in alignment when building tools and dies.

The present invention may be utilized in any application wherein it is desired to transfer from one machine element to another a specific and exact location for a hole, the transfer device incorporating means for placing a mark on an element within which it is desired to make such a hole. These holes are generally provided for the purpose of receiving cap screws, bolts and the like.

In many tool and die operations, it is necessary to fasten various parts together with the use of blind tapped recesses which do not go entirely through one of the elements. In these types of operations, it is also essential that the position of the holes be precise since the tolerances in these types of operations are often very small.

The present invention represents an improvement over conventional well-known transfer devices such as disclosed in U.S. Patent No. 2,092,653, wherein transfer screws are provided with marking means at one end thereof, the screws including a screw threaded body portion which is adapted to be threaded into a tapped hole in an associated element. This type of conventional construction has proved to be disadvantageous in a number of different aspects, and the present invention provides an improved construction which eliminates the disadvantages encountered with prior art construction.

It has been found during actual practice that many of the die sections employed with the transfer screws are hardened and must be cleaned out thoroughly resulting in shrinkage of the sections. Accordingly, when the elements are bumped so as to mark the location for the hole, the threads are injured on both the transfer screw and the workpiece which is, of course, a very undesirable result. Another inherent difficulty when utilizing the screw-threaded transfer screws is the fact that they must be tightened up into operative position with a wrench, which is a time-consuming operation.

Another disadvantage of the conventional transfer device having a threaded body portion is the fact that it is obviously only adapted for use with tapped holes and can not be successfully employed with drilled holes, having a relatively smooth bore of the proper diameter drilled in the section or tool, which diameter is the right size for the tapping of the predetermined thread.

The present invention overcomes the disadvantages as discussed above with prior art devices by providing a body means including a resilient portion which is adapted to expand and contract in a radial direction thereby eliminating the provision of any screw threads which of course prevents the possibility of damaging the screw threads and further which eliminates the necessity of tightening up the transfer device with a wrench since the transfer device can be inserted manually by pressing longitudinally thereof to position the device in its operative location.

A particular advantage of the construction of the present invention is that it operates equally well with either tapped or drilled holes of the proper size for tapping the thread, the construction serving to hold the transfer device tightly in its operative position with either type of hole, and the arrangement also serving to retain the transfer device within holes of slightly different sizes. For ordinary manufacturing not more than 75 percent or 80 percent of the thread depth is necessary, and for some classes of work, not more than 50 percent is required. As a result, the tapped drill may vary several thousandths of an inch in diameter, but the transfer device due to its ability to accommodate radial expanding and contraction movement can be pressed in and retained within a hole even though the tapped drill hole size varies.

In addition, the novel construction of the present invention ensures that the transfer device will be held in a truly concentric position within the hole in the associated element.

An object of the present invention is to provide a new and novel transfer device which is easy to insert into operative position and wherein the possibility of damage to the device during use is substantially eliminated.

Another object of the invention is the provision of a transfer device which does not require tightening by wrench or any other means to dispose the device in its proper operative relationship.

A further object of the invention is to provide a transfer device which will automatically be held tightly in operative position even though the size of the hole may vary to some slight extent.

Still another object of the invention is the provision of a transfer device incorporating means for ensuring that the device will be automatically held in truly concentric position within a hole.

Still another object of the invention is to provide a transfer device which operates equally well with tapped or drilled holes.

Other objects and many attendant advantages of the invention will become more apparent when considered in connection with the specification and accompanying drawings wherein:

FIG. 1 is a longitudinal section through a portion of a press illustrating the manner in which the invention may be utilized;

FIG. 2 is an enlarged longitudinal section through a portion of the structure shown in FIG. 1;

FIG. 3 is a sectional view taken substantially along line 3—3 of FIG. 2 looking in the direction of the arrows;

FIG. 4 is an enlarged top perspective view of the transfer device of the present invention;

FIG. 5 is an exploded perspective view of the transfer device of the present invention;

FIG. 6 is a longitudinal section illustrating the use of a transfer device with a tapped hole;

FIG. 7 is an elevational view illustrating a modified form of the transfer device according to the present invention;

FIG. 8 is a sectional view taken substantially along line 8—8 of FIG. 7 looking in the direction of the arrows;

FIG. 9 is an elevational view of a still further modified form of the invention;

FIG. 10 is a sectional view taken substantially along line 10—10 of FIG. 9 looking in the direction of the arrows; and FIG. 11 is a bottom view of the device illustrated in FIGS. 9 and 10.

Referring now to the drawings wherein like reference characters designate corresponding parts throughout the several views, there is illustrated in FIG. 1 a die set including a die shoe 1 and a punch holder 2, the punch holder being guided in its movement with the ram of a conventional press by means of a guide pin 3 fitting within a guide bushing 4, guide pin 3 being fixed to the die shoe and the guide bushing 4 being fixed to the punch holder.

Die sections 5 and 6 are illustrated as being supported on the upper surface of the die shoe, it being assumed that these die sections have been placed in the exact desired location, die section 5 being illustrated as held in operative position by means of a cap screw 7 and a dowel 8 while die section 6 is illustrated as held in place by the cap screw 9, it being understood that a dowel may also be associated with this die section for positively retaining it in its exact location.

A punch pad 10 is shown as having a cutting punch 11 secured to the under surface thereof and being held in place by means of a cap screw 12 and a dowel 13. The punch pad 10 also carries a pair of similar punches 14 and 15. Shim stock 16 is illustrated as disposed about the lower end of punch 15 and within the punch receiving openings 17 in die section 6, the shim stock being utilized to properly locate the punch pad with respect to the lower die sections. Parallels 18 are positioned on the upper surfaces of the die sections and engage the under surface of the punch pad for supporting the punch pad in proper spaced relationship to the die sections for the purpose of transferring the location of holes from the punch pad to the under surface of the punch holder 2.

Punch pad 10 is illustrated as having blind drilled holes 19 formed in the upper surface thereof, and it is desired to transfer the location of these holes to the punch holder. For this purpose, transfer devices indicated generally by reference numerals 20 are mounted within holes 19, devices 20 having marking means on the upper ends thereof such that when the punch holder is lowered into engagement therewith, suitable markings will be made on the under surface thereof such that holes as indicated by phantom lines in reference numerals 22 may be subsequently drilled to receive cap screws or bolts for securing the punch pad to the under surface of the punch holder. This operation will be well understood by one skilled in the art.

Referring now more particularly to FIGS. 2 through 5 inclusive, the transfer device of the present invention is more clearly illustrated and comprises a body means indicated generally by reference numeral 25 formed of a suitable hard material such as shock-resisting steel and having a generally circular cross-sectional configuration, the body means having an enlarged head portion 26 formed at one end thereof which may be knurled therearound for facilitating manual grasping of the transfer device.

The enlarged head portion 26 is provided inwardly of the outer periphery thereof with a substantially circular ridge portion 30 which has a generally triangular cross-sectional configuration and which terminates in a sharp upper edge portion 31. Disposed centrally within this circular ridge is a longitudinally extending projection 35 of generally conical shape terminating in a sharp point 36. As seen most clearly in FIGS. 2 and 6, the outermost end portion of the projection 35, or in other words the sharp tip portion thereof, extends longitudinally beyond the plane defined by the sharp upper edge 31 of the circular ridge 30 which is seen in dotted lines in these figures. This assures that the sharp pointed end of the projection will engage the surface of the element within which it is desired to mark the position of the hole prior to engagement of such element by the sharp upper edge of the circular ridge.

The body means is adapted to fit within the hole in an associated element and is provided with a circumferentially extending groove 40 formed in the outer surface thereof. Within this groove is seated a resilient means indicated generally by reference numeral 42, the resilient means 42 having a longitudinal dimension substantially equal to that of the groove but preferably slightly less in order that the resilient means 42 can readily expand and contract in a radial direction as is required during operation of the device.

Resilient means 42 is formed of a suitable resilient material such as spring steel, the resilient means having a longitudinal slot 45 extending throughout the length thereof such that the resilient means is longitudinally split and can expand radially when mounted on the body means and can also contract radially so as to accommodate the device to different sided holes.

It is apparent as seen in FIGS. 2, 4 and 6 that the resilient means is seated within groove 40 during use of the transfer device.

The resilient means is generally tubular in that a bore is formed completely therethrough and in addition has a generally barrel-shaped outer configuration. The resilient means in its free form is generally circular in cross-sectional configuration and has an arcuate longitudinal sectional configuration as seen in FIGS 2 and 6, which is symmetrical and wherein the maximum cross-sectional dimension of the resilient means is disposed at substantially the midpoint of the longitudinal dimension thereof.

In FIGS. 1 and 2, the transfer device is shown as mounted in a drilled hole, and it is apparent that the device is quite effective when utilized with this type of hole. Turning now to FIG. 6, the device is illustrated as mounted within a tapped hole 50 in an element 10' and in this instance it is desired to transfer the marking to the movable member 2', members 10' and 2' as illustrated in FIG. 6 corresponding to members 10 and 2 respectively as discussed in connection with FIGS. 1 and 2. It will be observed that the transfer device is equally effective when utilized in a tapped hole having an inner dimension similar to that of the drilled hole shown in FIGS. 1 and 2, in each case the mid portion of the resilient means resiliently engaging the associated adjacent walls of the hole so as to retain the transfer device tightly within the hole in concentric relationship therewithin.

It will be understood that when the components are in the assembled position shown in FIG. 1, downward movement of the movable punch holder 2 will cause the projection 35 and the circular ridge portion 30 to form a dot and concentric circle respectively in the under surface of the punch holder since the sharp point 36 and the sharp edge 31 of the marking means are concentric with one another. These marks so formed on the under surface of the punch holder provide the center mark and the outer peripheral mark of a hole to be drilled therein.

Referring now to FIGS. 7 and 8 of the drawings, a modified form of the invention is illustrated wherein a body means indicated generally by reference numeral 60 includes an enlarged head portion 62 formed of hardened steel and the like which may be knurled therearound for facilitating manual grasping thereof.

Enlarged head portion 62 is provided with a substantially circular ridge portion 64 similar to the ridge portion 30 previously described, a longitudinally extending sharply pointed projection 66 also being provided similar to member 35 previously described in connection with the first illustrated modification.

A substantially cylindrical recess 68 is provided in the under surface of the enlarged head portion 62, this recess being adapted to receive a part of a body means indicated by reference numeral 70. Body means 70 is formed of a suitable resilient material such as polyurethane which may have a hardness of about 90 durometer hardness, and this body means may be formed of other suitable resilient materials such as rubber or the like.

Body 70 includes a lower portion 72 having an outer surface which is of generally barrel-shaped outer configuration, and in its free form is generally circular in cross-sectional configuration and has an arcuate longitudinal sectional configuration as seen in FIG. 8. Part 72 is symmetrical and the maximum cross-sectional dimension of this part is disposed at substantially the midpoint of the longitudinal dimension of part 72.

Body 72 also includes an upper part 74 of reduced dimension which may also be substantially cylindrical in configuration so as to fit snugly within the recess 68 in the enlarged head portion 62. Part 74 of the body 70 is fixedly secured in place within recess 68 by means of a suitable bonding material such as an epoxy resin adhesive material which provides an excellent bond between the portions 62 and 70.

Body 70 is also provided with a longitudinally extending bore 76 which extends through the central portion thereof and which serves not only to save a certain amount of material but also to provide a desired degree of resilience to the body so as to permit part 72 thereof to readily expand and contract in a radial direction so as to operate in a manner similar to the previously described modification such that it will be snugly received within a hole as indicated in phantom line within an associated element.

Referring now to FIGS. 9 through 11 inclusive, a further modified form of the invention is illustrated wherein the body means is indicated generally by reference numeral 80 and includes an enlarged head portion 82 formed of hardened steel or the like which is also knurled on the outer surface thereof for facilitating manual grasping thereof.

The enlarged head portion is provided with a substantially circular ridge portion 84 similar to ridge portion 30 as well as a longitudinally extending sharp pointed projection 86 similar to the projection 35 previously described.

Body means 80 includes an integral depending shank portion 88 of reduced diameter which is adapted to fit within a hole in an associated element as indicated in phantom lines. The depending shank portion 88 has a generally barrel-shaped outer configuration such that in its free form it is generally circular in cross-sectional configuration and has an arcuate longitudinal sectional configuration which is symmetrical and wherein the maximum cross-sectional dimension thereof is disposed substantially at the midpoint of the shank portion.

Shank portion 88 is provided with a central bore 90 formed therethrough, and the shank portion is provided with slot means in the form of four equally spaced slots 92. The relatively thin walled barrel-shaped shank portion in combination with the slots formed therein provide a resilient spring action which enables the shank portion to operate in a manner similar to the resilient portions discussed in connection with the previously described modifications.

It is apparent that the modification illustrated in FIGS. 9 through 11 inclusive will operate in substantially the same manner as those previously discussed.

Another feature of the present invention is the fact that the axial dimension of the transfer device from the under surface of the enlarged head portion thereof to the sharp upper edge of the circular ridge portion of each of the modifications is held within close tolerances so as to eliminate the need of adjusting individual transfer devices to a common height so that all will register when a plurality of devices are utilized simultaneously. This is accomplished by grinding the under surface of the enlarged heads of the transfer devices to the desired tolerance which may be on the order of ±.0003 inch. With this arrangement, several of the devices may be arranged in a straight line and when the impact is made to create the transfer marking each of the transfer devices will provide the same imprint.

It is apparent from the foregoing that there is provided a new and novel transfer device which is easy to insert into operative position since it can be readily manually inserted by pushing longitudinally on the transfer device, and can be as readily removed simply by pulling it out of the associated hole, there being no danger of damage to the transfer device when in use. There is no necessity for tightening the transfer device in operative position, and the resilient means will retain the device automatically in tight, operative relationship even though the size of the hole may vary slightly. The resilient means also serves to ensure that the transfer device is held in a truly concentric position. It is apparent from the foregoing that the transfer device operates equally well with either tapped or drilled holes, and accordingly, the transfer device of the present invention has maximum versatility and usefulness.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. A transfer device comprising body means, marking means supported at one end of said body means, said body means being adapted to fit within a hole in an associated element and including a resilient portion arranged to expand and contract radially with respect to the body means so as to fit snugly in either drilled or tapped holes and locate said marking means concentrically therein, said resilient portion comprising a one-piece body of resilient material having a continuous outer peripheral surface to ensure uniform expansion and contraction thereof and including a part having a generally barrel-shaped outer configuration for fitting within a hole.

2. Apparatus as defined in claim 1, wherein said body of resilient material comprising polyurethane has a longitudinally extending bore formed therein in the central portion thereof.

3. Apparatus as defined in claim 1, wherein said body of resilient material is generally circular in cross-sectional configuration and has an arcuate longitudinal sectional configuration with the maximum cross-sectional dimension of the body being disposed at a point substantially midway of the longitudinal dimension of said generally barrel-shaped part of the body.

4. A transfer device comprising a body means including an enlarged head portion of hard material having marking means formed on the outer surface thereof, said enlarged head portion having a substantially cylindrical recess formed in the undersurface thereof, said body means including a portion formed of resilient material, said resilient portion having an outer surface of generally barrel-shaped outer configuration which in its free form is generally circular in cross sectional configuration and has an arcuate longitudinal sectional configuration, said resilient portion being symmetrical with the maximum cross sectional dimension disposed at substantially the midpoint of the lower part thereof, said resilient portion including an upper part of reduced dimension of substantially cylindrical configuration which fits snugly in the recess in said enlarged head portion, said upper part of the resilient portion being fixed within said recess, said resilient portion having a longitudinally extending bore formed through the central portion thereof.

5. Apparatus as defined in claim 4 wherein said marking means includes a central projection extending longitudinally of the device and a circular ridge disposed in spaced surrounding relationship to said central projection, said central projection having a relatively sharp point and said ridge having a relatively sharp edge, said ridge lying in a plane, and said central projection extending longitudinally of said transfer device beyond said plane.

6. A transfer device comprising body means, marking means supported at one end of said body means, said body means being adapted to fit within a hole in an associated element and including a resilient portion arranged to expand and contract radially with respect to the body means so as to fit snugly in either drilled or tapped holes, said resilient portion comprising a body of resilient material including a part having a generally barrel-shaped outer configuration for fitting within a hole, said body of resilient material also including a second part of reduced dimension, said body means including an enlarged head portion having a recess formed therein, said part of the body of resilient material of reduced dimension being fitted within said recess and fixedly secured therewithin.

References Cited by the Examiner
UNITED STATES PATENTS

| | | | |
|---|---|---|---|
| 2,092,653 | 9/37 | Nielsen | 33—189 X |
| 2,114,228 | 4/38 | Maples | 33—191 |
| 2,384,071 | 9/45 | Boyer | 33—189 |
| 2,420,365 | 5/47 | Fischer | 33—191 |
| 2,500,653 | 3/50 | Berg | 33—189 |
| 2,587,516 | 2/52 | Parker | 33—191 |
| 2,612,222 | 9/52 | Sterba et al. | 33—191 |
| 2,704,681 | 3/55 | Fischer | 85—8.8 |

ROBERT B. HULL, *Primary Examiner.*

ISAAC LISANN, *Examiner.*